(12) United States Patent
Mamiya et al.

(10) Patent No.: US 9,279,940 B2
(45) Date of Patent: Mar. 8, 2016

(54) OPTICAL FIBER ADAPTER WITH SHUTTER MEMBER

(71) Applicants: PROTAI PHOTONIC CO., LTD., New Taipei (TW); SENKO ADVANCED COMPONENTS, INC., Marlborough, MA (US)

(72) Inventors: Tomoyuki Mamiya, Marlborough, MA (US); Jyh-Cherng Yang, Taipei (TW); Yu-Kai Chen, Taipei (TW)

(73) Assignees: Protai Photonic Co., Ltd., New Taipei (TW); Senko Advanced Components, Inc., Marlborough, MA (US)

( * ) Notice: Subject to any disclaimer, the term of this patent is extended or adjusted under 35 U.S.C. 154(b) by 82 days.

(21) Appl. No.: 14/268,105

(22) Filed: May 2, 2014

(65) Prior Publication Data

US 2015/0285999 A1    Oct. 8, 2015

(30) Foreign Application Priority Data

Nov. 8, 2013 (TW) .............................. 102140819 A

(51) Int. Cl.
  *G02B 6/38* (2006.01)
  *G02B 6/24* (2006.01)
(52) U.S. Cl.
  CPC .............. *G02B 6/243* (2013.01); *G02B 6/3887* (2013.01); *G02B 6/3893* (2013.01)
(58) Field of Classification Search
  CPC ..... G02B 6/243; G02B 6/3887; G02B 6/3893
  USPC .......................................................... 385/56
  See application file for complete search history.

(56) References Cited

U.S. PATENT DOCUMENTS

| 6,402,388 | B1 * | 6/2002 | Imazu | .................. | G02B 6/3885 |
| | | | | | 385/60 |
| 2009/0226141 | A1 | 9/2009 | Lin et al. | | |
| 2009/0290838 | A1 | 11/2009 | Lin et al. | | |
| 2012/0177327 | A1 | 7/2012 | Demeritt et al. | | |
| 2012/0321266 | A1 * | 12/2012 | Lin | ...................... | G02B 6/3825 |
| | | | | | 385/134 |
| 2013/0322828 | A1 * | 12/2013 | Busse | .................. | G02B 6/3825 |
| | | | | | 385/77 |

* cited by examiner

*Primary Examiner* — Jerry Blevins
(74) *Attorney, Agent, or Firm* — Rosenberg, Klein & Lee

(57) ABSTRACT

An optical fiber adapter includes a main body, two hook members, a hollow middle member and an elastic shutter member. The hook member has two hooks and two opposing walls that define a passage. The main body has an access opening on a first wall thereof for the two hook members and middle member to place within the passage of the main body. The middle member is positioned between the two hook members when the hook members and middle member are placed in the passage of the main body. The shutter member includes a fixing portion, a shutter plate and a connecting portion. The fixing portion is positioned in the accommodation recess formed on the first wall of the first hook member. The connecting portion connects the fixing portion with the shutter plate. The shutter plate extends from the connecting portion and into the passage.

19 Claims, 11 Drawing Sheets

OPTICAL FIBER ADAPTER WITH SHUTTER MEMBER

RELATED APPLICATION

The present application is based on and claims priority to Taiwanese Application Number 102140819, filed Nov. 8. 2013, the disclosure of which is hereby incorporated by reference herein in its entirety.

BACKGROUND

1. Technical Field

The disclosure relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY

The present disclosure provides a shutter member for an optical fiber adapter that may obstruct the light beams emitted from the passage thereby preventing the eyes from exposure to the light beams.

In one embodiment, the optical fiber adapter of the present disclosure includes a main body, two hook members, a hollow middle member and an elastic shutter member. The hook member has two hooks and two opposing walls that define a passage. The main body has an access opening on a first wall thereof for the two hook members and middle member to place within the passage of the main body. The middle member is positioned between the two hook members when the hook members and middle member are placed in the passage of the main body. The shutter member includes a fixing portion, a shutter plate and a connecting portion. The fixing portion is positioned in the accommodation recess formed on the first wall of the first hook member. The connecting portion connects the fixing portion with the shutter plate. The shutter plate extends from the connecting portion and into the passage.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
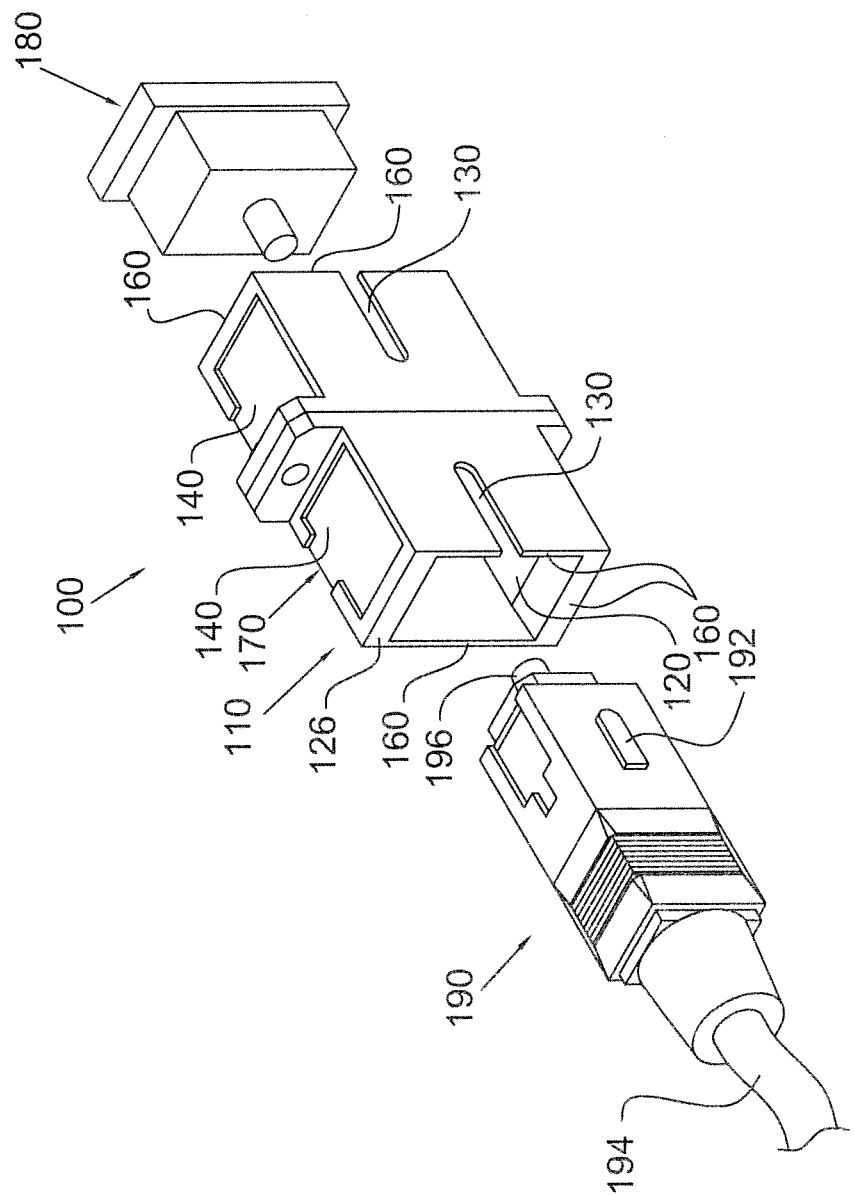
FIG. 1 is an elevated perspective view illustrating a conventional optical fiber adapter and a conventional optical fiber connector.
Figure 2:
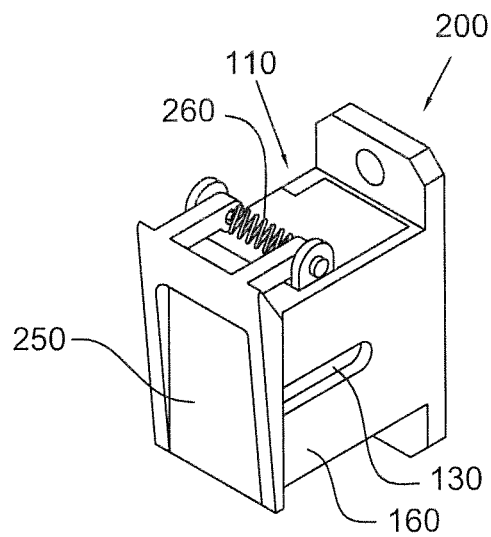
FIG. 2 is an elevated perspective view of a conventional optical fiber adapter with a cover for obstructing the light beams emitted from the receiving recess.
Figure 3:
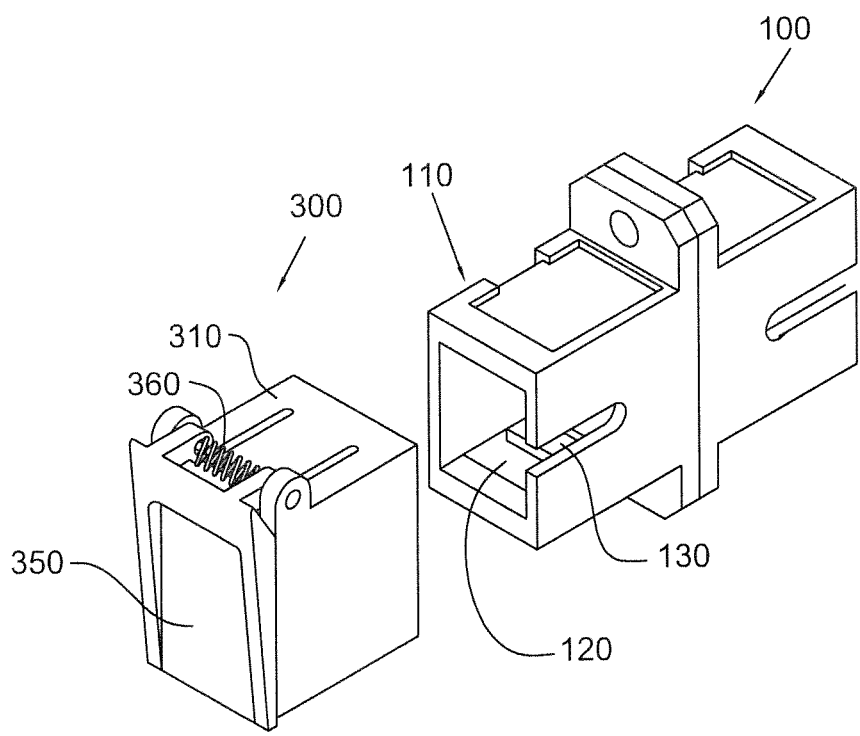
FIG. 3 is an elevated perspective view of a conventional protection cap for an optical fiber adapter.
Figure 4:
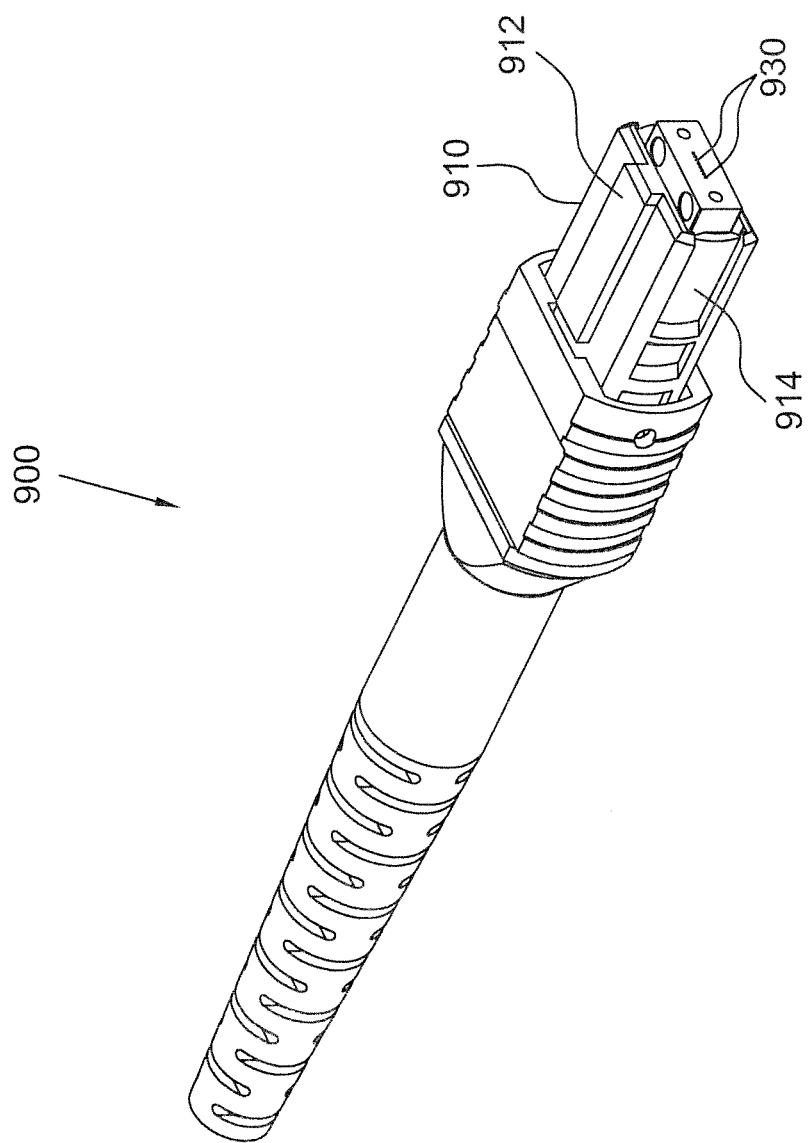
FIG. 4 is an elevated perspective view of a conventional MPO type optical fiber connector.

Referring to FIG. 4, it illustrates a conventional MPO type optical fiber connector 900. The connector 900 has a plurality of optical fibers 930 exposed from the front end thereof and a rectangular protrusion 912 formed on the upper surface of the main body 910. Recesses 914 are formed at both sides of the main body 910, respectively.

Figure 5:
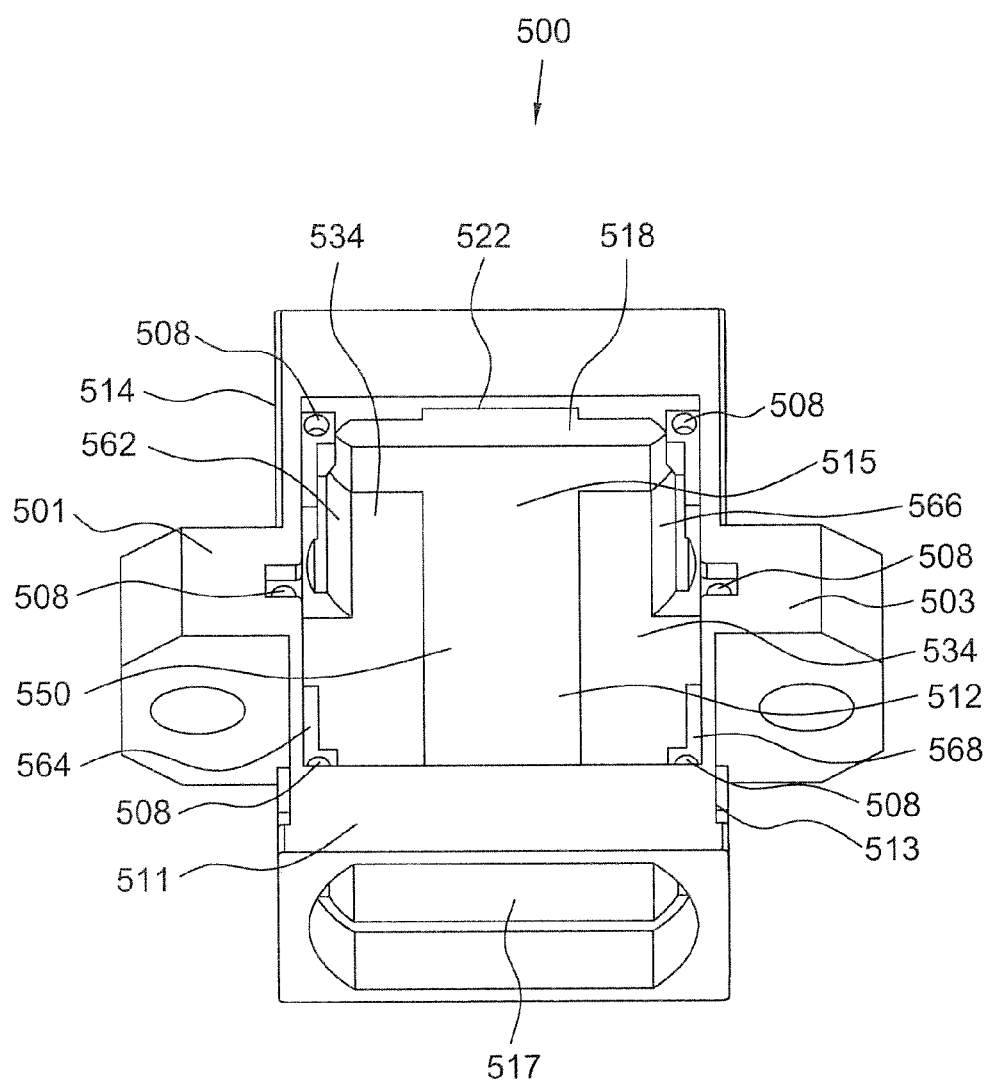
FIG. 5 is an elevated perspective view of the main body of the optical fiber adapter of the present disclosure.

Referring to FIG. 5. the optical fiber adapter according to the present disclosure may be a MPO type optical fiber adapter and includes a molded plastic main body 500. In one embodiment, the main body 500 is substantially rectangular and has a passage 515 in an axial direction defined by top wall 511, bottom wall 512, right wall 513 and left wall 514. The passage 515 of the main body 500 has opposing first opening 517 and second opening 518 in the axial direction, wherein the optical fiber connectors 900 of FIG. 4 may be inserted into the passage 515 through the openings 517, 518 respectively to mate with each other. Located on the exterior of the main body 500 is a pair of tabs 501 and 503. One tab 501 is located on the left wall 514 and the other tab 503 is located on the right wall 513. The tabs 501 and 503 are operative in supporting the adapter on a surface. An access opening 550 is located on the top wall 511 of the main body 500.

Located near the second opening 518 on the left wall 514 and right wall 513 are protrusions 562 and 566, respectively. Located near the first opening 517 on the left wall 514 and right wall 513 are protrusions 564 and 568, respectively. Furthermore, an indentation 522 is located near the second opening 518 on the top wall 511 and another indentation (not shown) is located near the first opening 517 on the top wall 511. Two opposing protrusions 534 are located near the second opening 518 on the bottom wall 514. A plurality of openings 508 are formed on the right and left walls 513, 514.

Figure 6:
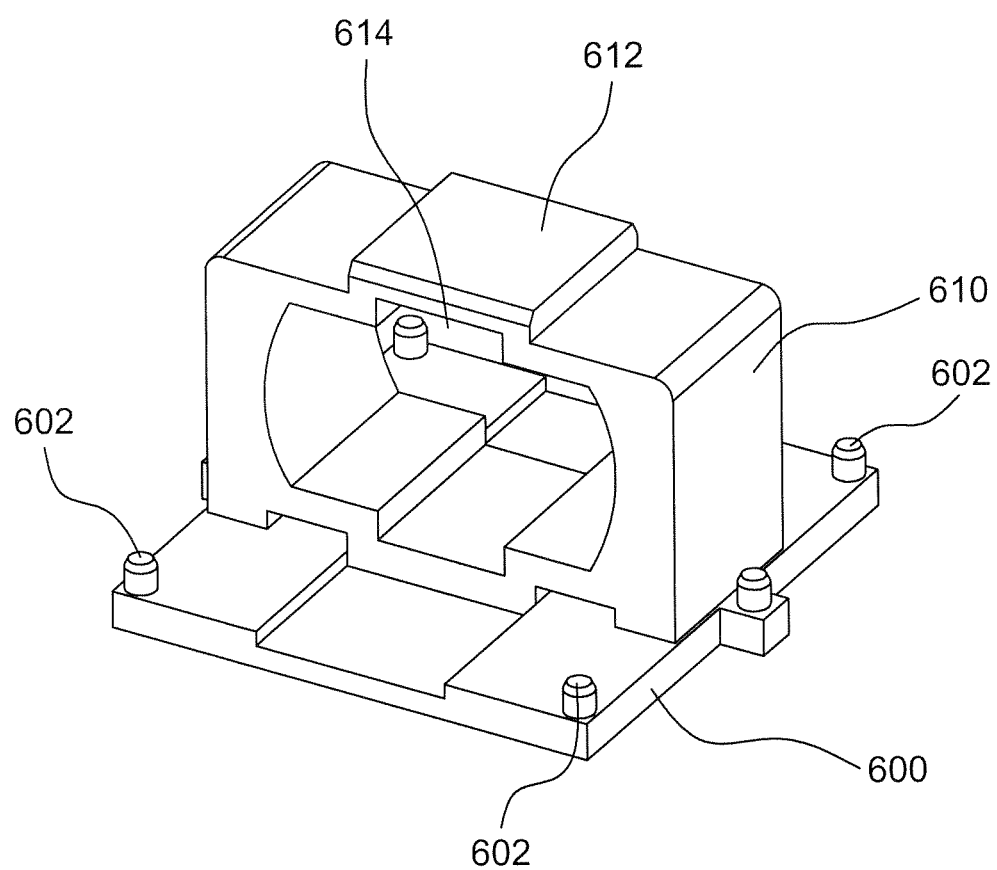
FIG. 6 is an elevated perspective view of the cover and middle member of the optical fiber adapter according to the present disclosure.

Referring to FIG. 6 the optical fiber adapter of the present disclosure further includes a cover plate 600 and a hollow middle member 610 integrally formed on the cover plate 600. The middle member 610 may be annular. A protrusion 612 is formed on the outer side surface of the middle member 610 and an indentation 614 is formed on the inner side surface of the middle member 610.

Figure 7:
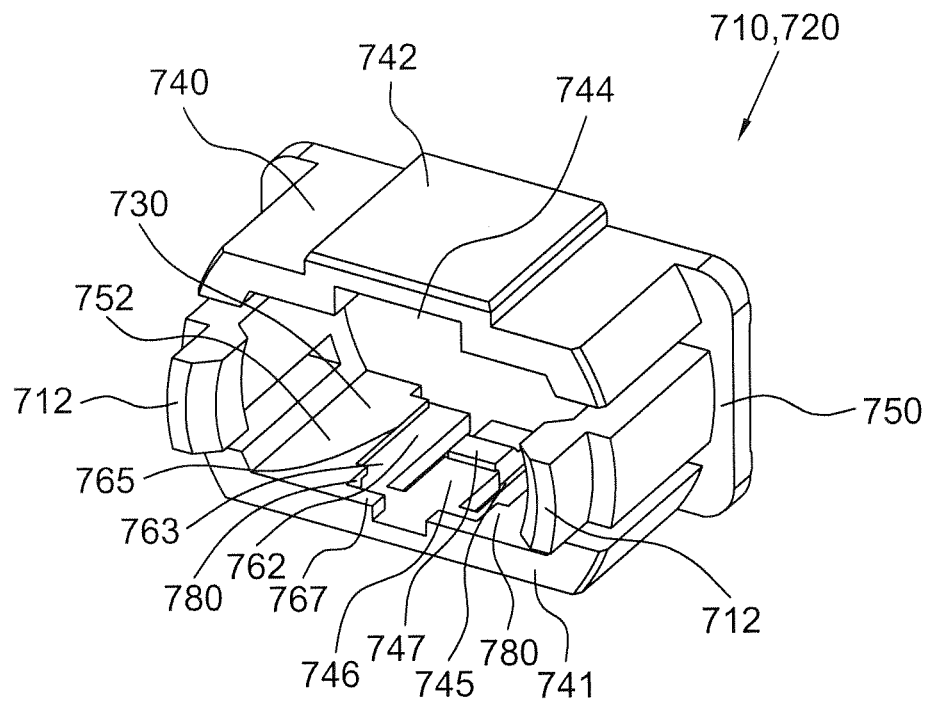
FIG. 7 is an elevated perspective view of the hook members of the optical fiber adapter according to the present disclosure.
Figure 8:
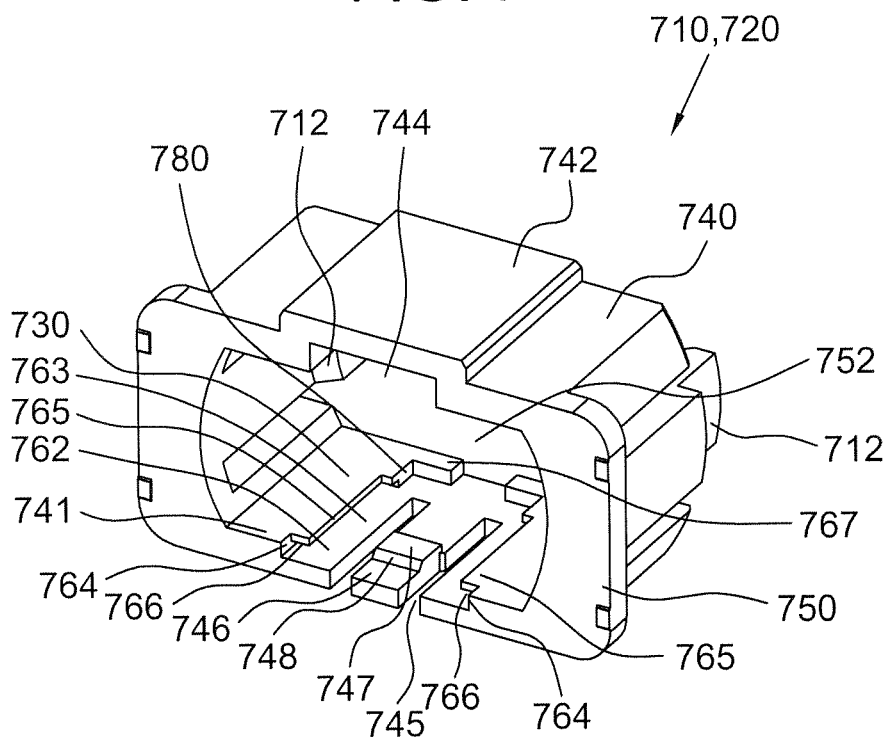
FIG. 8 is another elevated perspective view of the hook members of the optical fiber adapter according to the present disclosure.

Referring to FIGS. 7 and 8, the optical fiber adapter of the present disclosure still further includes two identical hook members 710 and 720 that are constructed by injection molding. Each of the members 710, 720 is provided with a pair of hooks 712 extending from one end of a generally rectangular flange 750, wherein the hooks 712 are configured to hook on to the recesses 914 on the optical fiber connector 900 of FIG. 4. Each of the flanges 750 includes an opening 752 located between the two hooks 712. Moreover, two opposing walls 740 and 741 extend from the flange 750 and define with the hooks 712 a generally rectangular passage 730. Located outside the passage 730 on the wall 740 is a protrusion 742 with a width of slightly smaller than that of the indentation 522 and the space between the opposing protrusions 534. Located inside the passage 730 on the wall 740 is an indentation 744 with a width of greater than that of the protrusion 912 on the optical fiber connector 900 of FIG. 4. Located inside the passage 730 on the wall 741 is a generally rectangular accommodation indentation 762 defined by a bottom wall 763, two longitudinal side walls 764 and a transverse side wall 767, wherein the side walls 764 and 767 extend upwards from the bottom wall 763, and the side wall 767 connects with the side walls 764. Two opposing top walls 765 extend from the tops of the side walls 764, respectively and are substantially parallel to the bottom wall 763. Therefore, the bottom wall 763, the side wall 764 and the top wall 765 connecting with the side wall 764 together define an accommodation recess 766. Located within the accommodation indentation 762 on the bottom wall 763 is at least one stop block 780. In addition, a breach 745 is formed at the bottom wall 763. An arm 746 extends from the bottom wall 763 toward the breach 745 and is substantially parallel to the side walls 764. Located at the arm 746 is a protrusion 747 and the protrusion 747 has an inclined plane 748 formed on the side of the protrusion 747 far away from the side wall 767.

Figure 9:
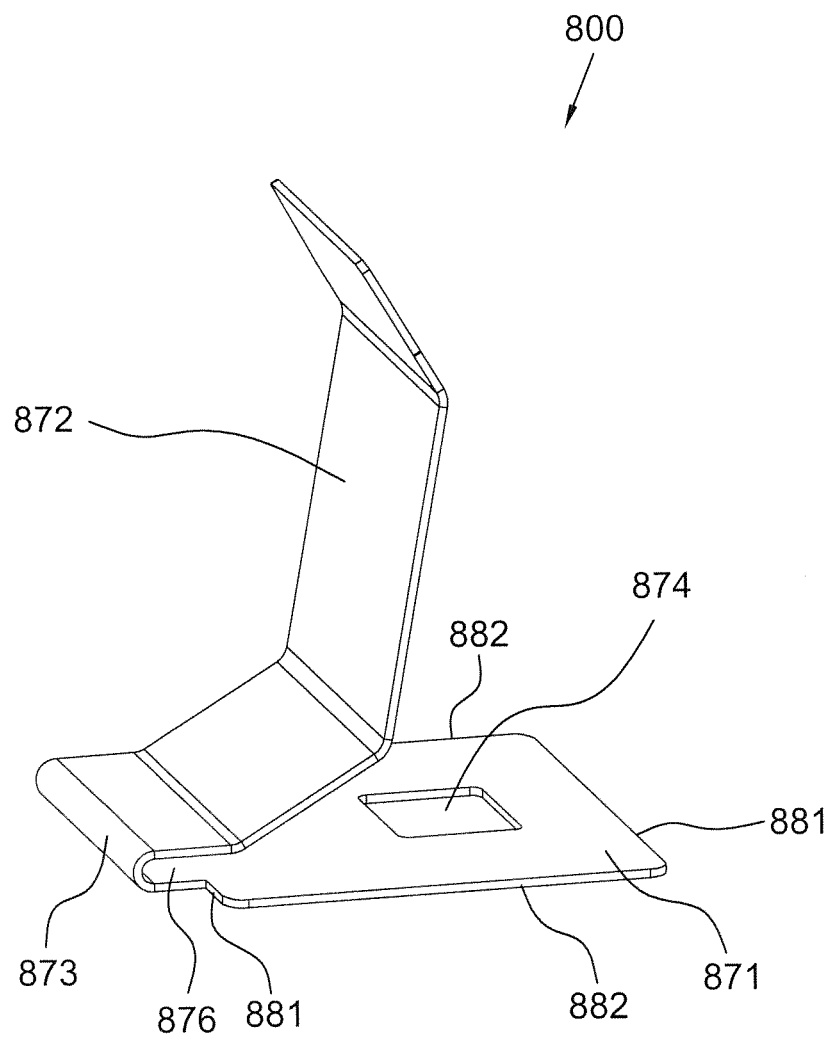
FIG. 9 is an elevated perspective view of the shutter member of the optical fiber adapter of the present disclosure.

Referring to FIG. 9, the optical fiber adapter of the present disclosure still further includes an elastic shutter member 800 that is integrally formed with metal. The shutter member 800 includes a shutter plate 872, a fixing portion 871 and a connecting portion 873. The connecting portion 873 connects the fixing portion 871 with the shutter plate 872 and is generally U-shaped. That is, the connecting portion 873 is curved and has a notch 876. The fixing portion 871 is plate-like and has a rectangular shape, The fixing portion 871 has a pair of longitudinal sides 882 and a pair of transverse sides 881, wherein one of the transverse sides 881 connects with the connecting portion 873 and protrudes from the connecting portion 873.

An opening 874 is formed on the fixing portion 871 to receive the protrusion 747 on the arm 746. The shutter plate 872 may contain a single plate or several plates. The shutter plate 872 may move with respect to the fixing portion 871. The shutter plate 872 is moved close to the fixing portion 871 with a push force and quickly moves back when the push is withdrawn.

According to the present disclosure, the access opening 550 located on the top wall 511 of the main body 500 is configure to allow the hook members 710, 720, shutter member 800 and middle member 610 to be placed in the passage 515 of the main body 500.

Figure 10:
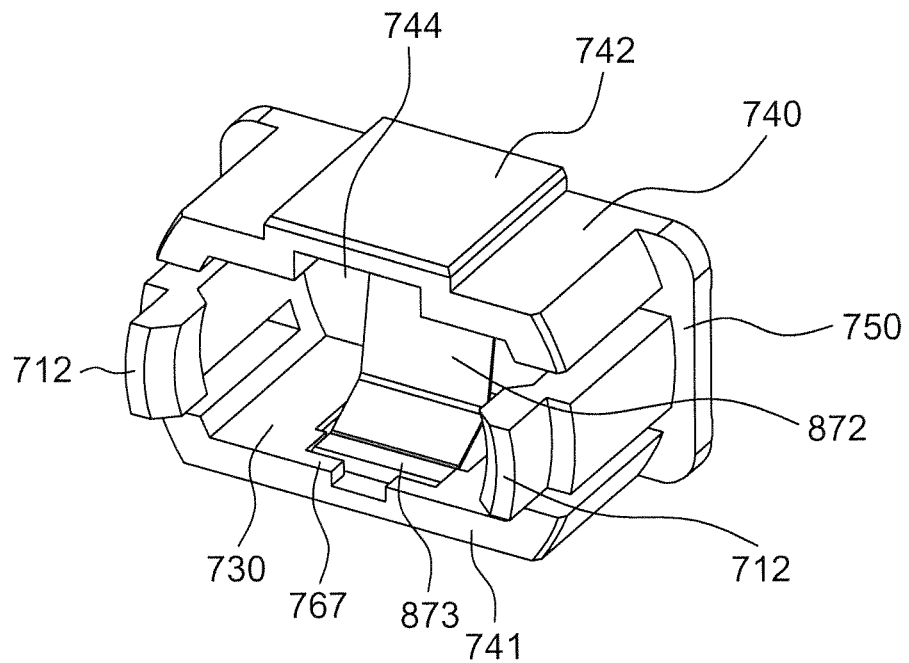
FIG. 10 is an elevated perspective view illustrating that the shutter member is mounted to one of the hook members of the optical fiber adapter according to the present disclosure.
Figure 11:
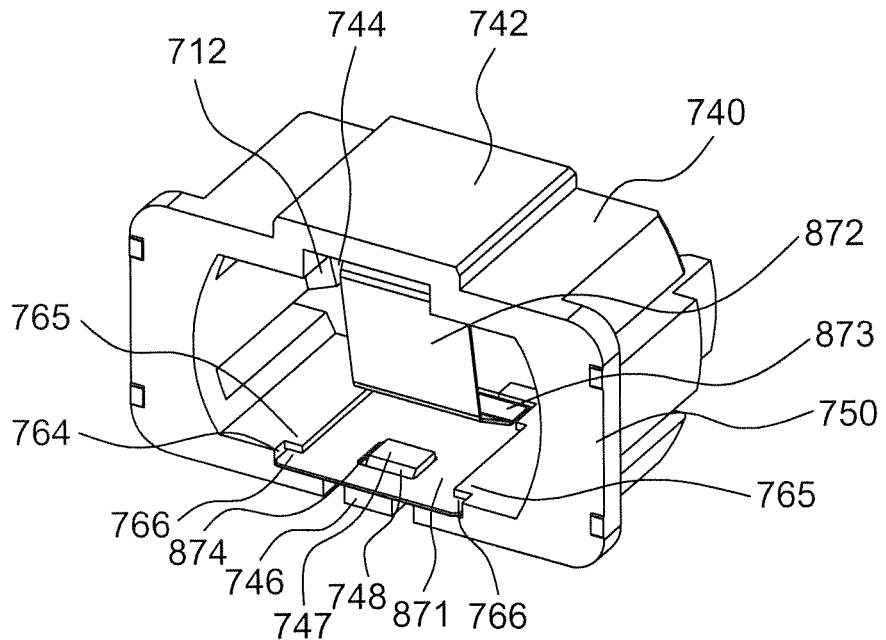
FIG. 11 is another elevated perspective view illustrating that the shutter member is mounted to one of the hook members of the optical fiber adapter according to the present disclosure.

In assembling the optical fiber adapter of the present disclosure, the shutter member 800 is pushed toward the accommodation indentation 762 on one of the hook members 710, 720, said hook member 710. During the push of the shutter member 800, the connecting portion 873 will confront the protrusion 747 on the arm 746. Since the arm 746 may be pressed down, the connecting portion 873 and fixing portion 871 in sequence will press down the protrusion 747 and slide on the inclined plane 748 thereof. In the meantime, the longitudinal sides 882 of the fixing portion 871 will be pushed into the accommodation recesses 766, respectively. Finally, the protrusion 747 on the arm 746 will move back to the original position and protrude into the opening 874 on the fixing portion 871. FIGS. 10 and 11 illustrate that the shutter member 800 is mounted to the hook member 710.

Figure 12:
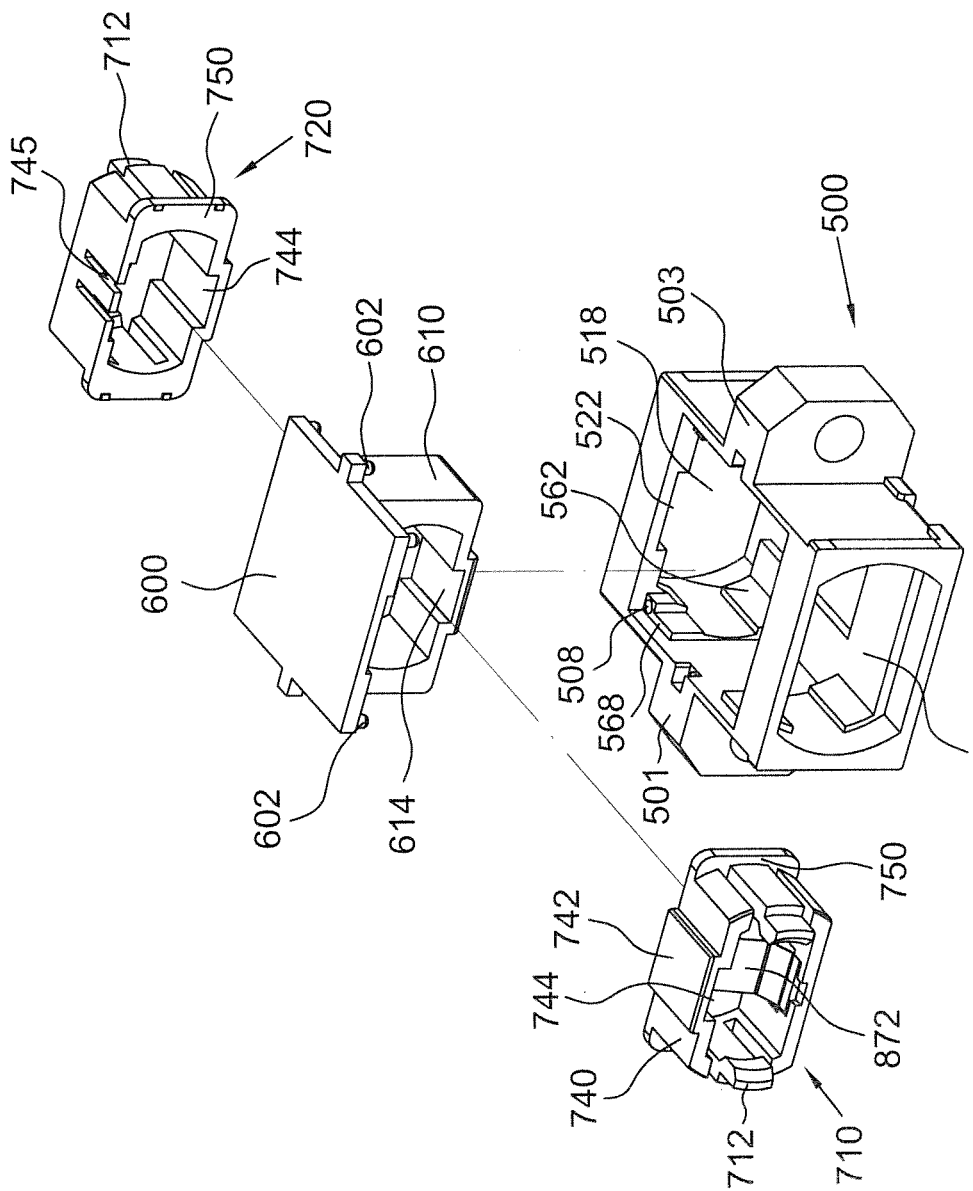
FIG. 12 illustrates how to assemble the shutter member, hook members and middle member together into the main body of the optical fiber adapter according to the present disclosure.

Referring to FIG. 12, afterward the hook member 720 and the hook member 710 with the shutter member 800 are placed in the passage 515 of the main body 500 through the access opening 550 such that the protrusion 742 of the hook member 710 is placed in the indentation located near the first opening 517 on the top wall 511 and the protrusion 742 of the hook member 720 is placed in the space between the protrusions 534. Alternatively, the protrusion 742 of the hook member 720 may be placed in the indentation 522 near the second opening 518 on the top wall 511 instead of in the space between the protrusions 534 (not shown). Subsequently, the middle member 610 is inserted into the passage 515 through the access opening 550 and is placed between the flanges 750 of the hook members 710 and 720. The middle member 610 will be in tight contact with the flanges 750 of the hook members 710 and 720 when the middle member 610 is positioned in place. The hook members 710 and 720 will therefore be pushed outwardly toward the openings 517 and 518 of the main body 500, respectively so that the flanges 750 thereof are positioned against the protrusions 564, 568 and 562, 566, respectively. This way the hook members 710, 720 and middle member 610 may be firmly placed within the passage 515.

Figure 13:
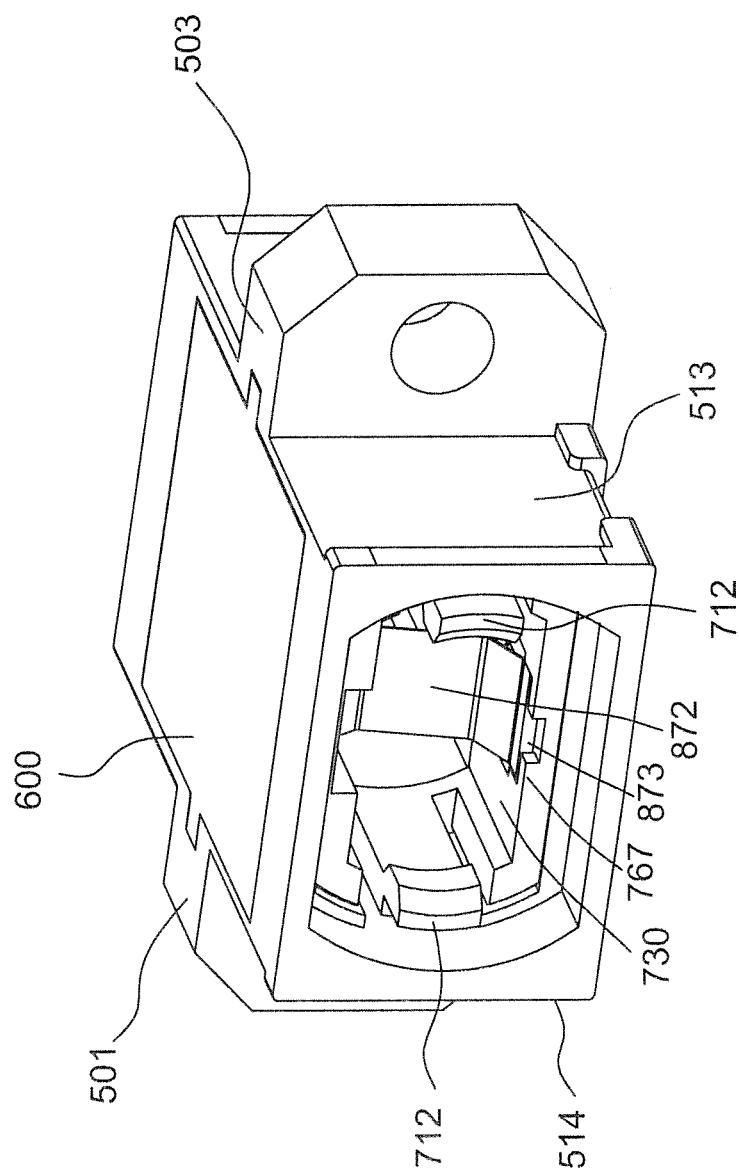
FIG. 13 is an elevated perspective view of the optical fiber adapter of the present disclosure.

Since the middle member 610 is attached to the cover 600, the cover 600 will cover the access opening 550 when the middle member 610 is placed in the passage 515. An ultrasonically welding may be used to attach the cover 600 to the main body 500. In order to more securely cover the access opening 550, the cover 600 is provided with the protrusions 602 such that these protrusions 602 will be in tight engagement with the corresponding openings 508 on the main body 500 when the cover 600 is brought to cover the access opening 550. FIG. 13 illustrates the well-assembled optical fiber adapter of the present disclosure.

Figure 14:
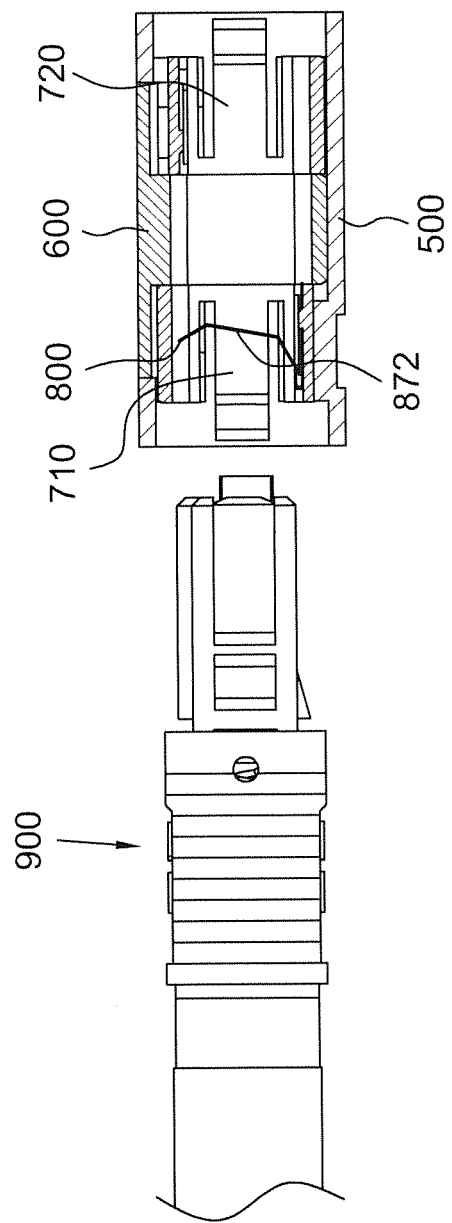
FIGS. 14 and 15 illustrate how to mate an optical fiber connector with the optical fiber adapter of the present disclosure.
Figure 15:
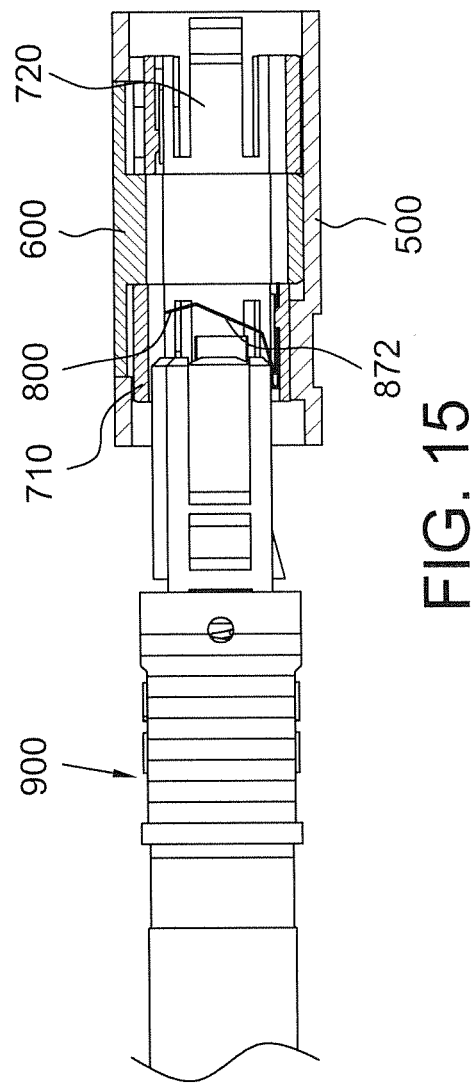

Referring to FIGS. 14 and 15, according to the optical fiber adapter of the present disclosure, there is no need to detach the shutter member 800 from the main body 500 prior to inserting the optical fiber connector 900 into the passage 515 of the main body 500. When the connector 900 is inserted into the main body 500 through the first opening 517, it will push down the elastic shutter plate 872 to the gap between the connector 900 and the bottom wall 512 of the main body 500. Upon pulling out the connector 900, the elastic shutter plate 872 will quickly spring up to an original position to obstruct the light beams emitted from the passage 515 as a result of elasticity. As a result, the occurrence of exposure to the harmful light beams may be avoided.

According to the optical fiber adapter of the present disclosure, the shutter plate 872 will be located to obstruct the passage 515 when the shutter member 870 is positioned in place. This way the light beams emitted from the passage 515 may be obstructed thereby preventing a user's eyes from exposure to the harmful light beams.

According to the optical fiber adapter of the present disclosure, the protrusion 747 at the hook member 710 may stop the fixing portion 871 from moving toward the hook member 720 when an optical fiber connector is inserted into the main body 500 through the first opening 517 to push the shutter member 800 toward the second opening 518. The transverse side 881 connecting with the connecting portion 873 will confront the stop block 780 when the shutter member 800 is tried to pull. Therefore, the stop block 780 may stop the shutter member 800 from being intentionally pulled out of the main body 500 from the first opening 517. In addition, the side wall 767 of the accommodation indentation 762 is acted as a protecting wall to protect the connecting portion 873 of the shutter member 800 from suffering an impact by an unmated optical fiber connector when the optical fiber connector is tried to insert into the main body 500 from the first opening 517. Since the longitudinal sides 882 of the fixing portion 871 are positioned under the top walls 765 of the hook member 710, respectively, they therefore may stop the shutter member 800 from being pulled upwards.

Although the present disclose has been explained in detailed with MPO type optical fiber adapter, it will be appreciated that the optical fiber adapter of the present disclosure may include other types of optical fiber adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter for optically coupling two optical fiber connectors with each other, each the optical fiber connector having two recesses thereon, the optical fiber adapter comprising:

two hook members defined as first and second hook members, respectively, each the hook member having a flange, a pair of hooks extending from the flange, and opposing first and second walls extending from the flange, the flange having an opening positioned between the hooks, the hooks and the first and second walls of each the hook member defining a passage, wherein the hooks are configured to hook on to the recesses of one the optical fiber connector, respectively, an accommodation indentation is formed on the first wall of the first hook member;

a hollow middle member;

a main body having a passage in an axial direction, the passage being defined by a first wall, a second wall, a third wall and a fourth wall, the first wall facing the third wall and connecting with the second and fourth walls, wherein the passage of the main body has opposing first and second openings in the axial direction to allow the two optical fiber connectors to insert into the passage of the main body to mate with each other, an access opening being formed on the first wall of the main body to allow the middle member and two hook members to place within the passage of the main body, wherein the middle member is positioned between the two hook members when the two hook members and middle member are placed in the passage of the main body; and an elastic shutter member, including:
- a fixing portion positioned in the accommodation indentation of the first hook member;
- a shutter plate; and
- a connecting portion connecting the fixing portions with the shutter plate;
- wherein the shutter plate extends from the connecting portion and into the passage of the first hook member.

2. The optical fiber adapter as claimed in claim 1, further comprising:
a protrusion formed on the first wall of the first hook member to stop the fixing portion of the shutter member from moving toward the second hook member.

3. The optical fiber adapter as claimed in claim 2, further comprising:
an arm extending from the first wall of the first hook member to carry the protrusion.

4. The optical fiber adapter as claimed in claim 3, wherein the first wall of the first hook member has a breach formed thereon, the arm protrudes into the breach.

5. The optical fiber adapter as claimed in claim 3, wherein the fixing portion of the shutter member has an opening formed thereon to receive the protrusion.

6. The optical fiber adapter as claimed in claim 3, wherein the protrusion has an inclined plane formed thereon.

7. The optical fiber adapter as claimed in claim 1, further comprising:
a stop block formed on the first wall of the first hook member to stop the fixing portion of the shutter member from being pulled out of the first hook member.

8. The optical fiber adapter as claimed in claim 1, wherein each of the second and fourth walls of the main body is provided with two protrusions, the flanges of the hook members are positioned against the protrusions on the second and fourth walls of the main body when the hook members and middle member are placed within the passage of the main body.

9. The optical fiber adapter as claimed in claim 1, further comprising:
a cover connecting with the middle member, configured to cover the access opening on the main body.

10. The optical fiber adapter as claimed in claim 9, wherein the cover is integrally formed with the middle member.

11. The optical fiber adapter as claimed in claim 1, wherein the optical fiber connectors are MPO type.

12. The optical fiber adapter as claimed in claim 1, wherein the hook members are identical to each other.

13. The optical fiber adapter as claimed in claim 1, wherein the middle member is annular.

14. An optical fiber adapter for optically coupling two optical fiber connectors with each other, each the optical fiber connector having two recesses thereon, the optical fiber adapter comprising:
two hook members defined as first and second hook members, respectively, each the hook member having a pair of hooks defining with opposing first and second walls a passage, wherein the hooks are configured to hook on to the recesses of one the optical fiber connector, respectively, an accommodation indentation is formed on the first wall of the first hook member, and a protrusion is formed on the first wall of the first hook member;

a hollow middle member;

a main body having a passage in an axial direction, the passage being defined by a first wall, a second wall, a third wall and a fourth wall, the first wall facing the third wall and connecting with the second and fourth walls, wherein the passage of the main body has opposing first and second openings in the axial direction to allow the two optical fiber connectors to insert into the passage of the main body to mate with each other, an access opening being formed on the first wall of the main body to allow the middle member and two hook members to place within the passage of the main body, wherein the middle member is positioned between the two hook members when the two hook members and middle member are placed in the passage of the main body; and an elastic shutter member, including:
- a fixing portion positioned in the accommodation indentation of the first hook member;
- a shutter plate; and
- a connecting portion connecting the fixing portions with the shutter plate;
- wherein the shutter plate extends from the connecting portion and into the passage of the first hook member, and
- wherein the protrusion formed on the first wall of the first hook member is configured to stop the fixing portion of the shutter member from moving toward the second hook member.

15. The optical fiber adapter as claimed in claim 14, further comprising:
an arm extending from the first wall of the first hook member to carry the protrusion.

16. The optical fiber adapter as claimed in claim 15, wherein the first wall of the first hook member has a breach formed thereon, the arm protrudes into the breach.

17. The optical fiber adapter as claimed in claim 15, wherein the fixing portion of the shutter member has an opening formed thereon to receive the protrusion.

18. The optical fiber adapter as claimed in claim 15, wherein the protrusion has an inclined plane formed thereon.

19. The optical fiber adapter as claimed in claim 14, further comprising:
a cover connecting with member, configured to cover the access opening on the main body.

* * * * *